United States Patent Office 2,903,371  
Patented Sept. 8, 1959

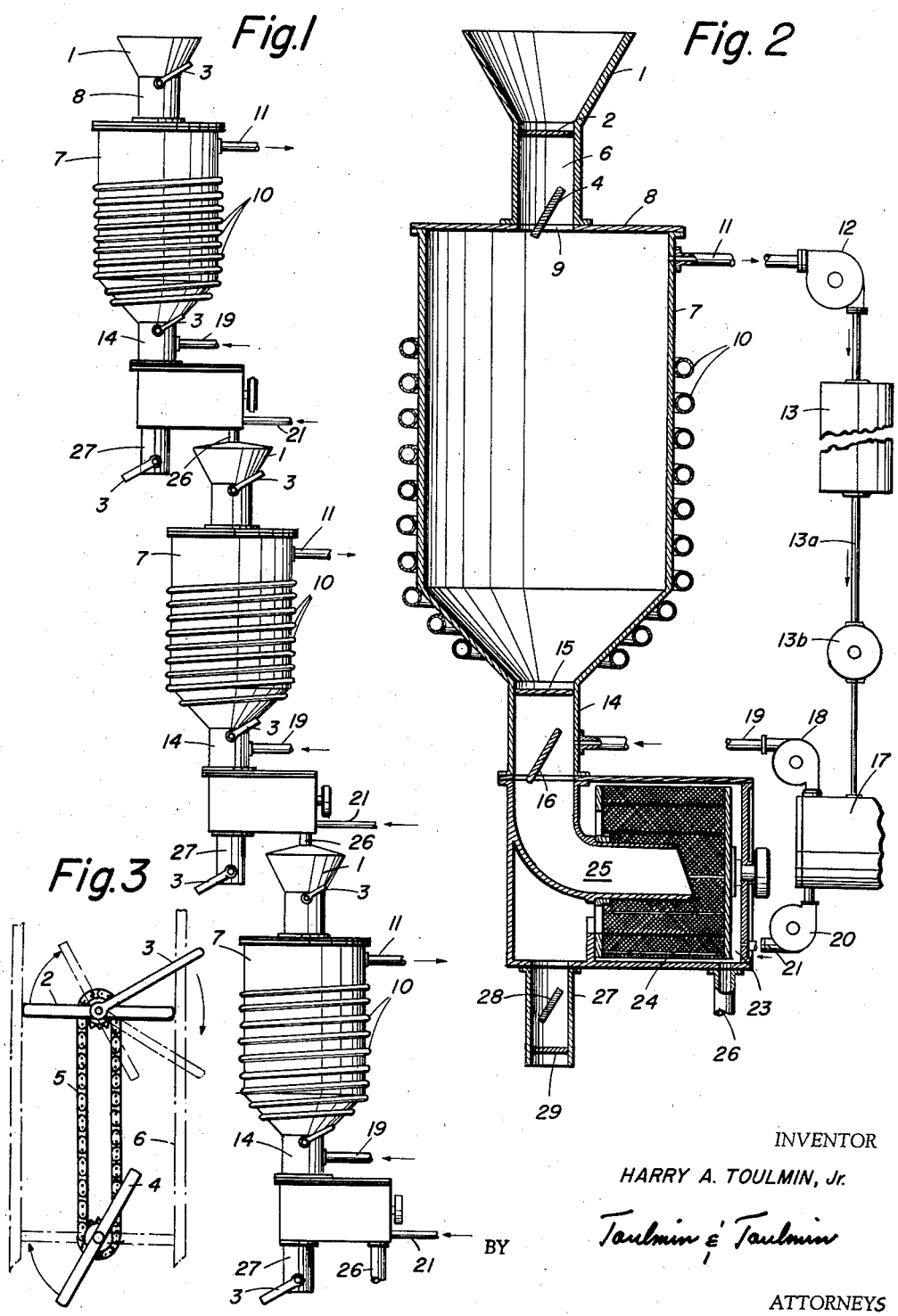

2,903,371

METHOD FOR FREEZING HEAT SENSITIVE LIQUIDS BEARING SOLIDS AND SIMULTANEOUSLY SCRUBBING AND PREVENTING OXIDATION

Harry A. Toulmin, Jr., Dayton, Ohio, assignor, by mesne assignments, to Union Carbide Corporation, New York, N.Y., a corporation of New York Application September 9, 1955, Serial No. 533,371

4 Claims. (Cl. 99—205)

This invention relates to a method and apparatus of dehydrating heat sensitive liquids by successive stages of freezing the water or other liquid content into which the solids are discharged.

A particular object of this invention is to provide an apparatus, such as is shown in Wenzelberger United States Patents Nos. 2,676,469 of April 27, 1954, and 2,657,549 of Nov. 31, 1953, in which two objectives are accomplished, that is, oxidation of the heat sensitive liquid and its solids is prevented and, secondly, the gas to prevent oxidation is carried through the liquid being dehydrated for the purpose of stripping from the liquid and its solids any entrained carbon dioxide gas.

Another particular object of this invention is to be able to circulate the inert gas in a counter-current direction while the contents of the tank is being agitated and frozen so as to bring about the stripping of carbon dioxide, and also to maintain over the top of the heat sensitive liquid a blanket of the stripped gas which also prevents oxidation, such as nitrogen.

Further objects of this invention are to provide a unitary construction comprising a freezing tank with suitable refrigeration, to provide means of agitation of the contents of the tank to accelerate the formation of ice crystals from the water or other liquid containing the solids, to provide dual valves operating at both the inlet and the outlet from the tank, to provide a centrifuge for separating the ice from the dehydrated liquid, and to provide a supply of inert gas, such as nitrogen, and pass it upwardly through the heat sensitive liquid so it will strip the carbon dioxide from the contents and maintain on top of the liquid an anti-oxidation nitrogen blanket and provide means of continuous circulation of nitrogen or its equivalent for these purposes.

It is still a further object of this invention to provide a nitrogen blanket in the centrifuge to prevent any oxidation.

It is another object of this invention to so adjust the pressure on the nitrogen that counter-current circulation and blanketing will take place automatically irrespective of the opening and closing of the dual valves at the top and bottom of the tank.

It will be understood that several of the problems in handling heat sensitive liquids, such as citrus juice, milk, beer and other similar liquids, when subjected to freezing of the water in order to extract the water in the form of ice crystals without any occluded crystals, are as follows:

(1) To prevent oxidation, and  
(2) To strip carbon dioxide from the liquid, as oxidation from the air and the presence of carbon dioxide gas have, respectively, bad effects upon the taste of the resulting dehydrated products.

The problem is to provide continuous fresh nitrogen, or its equivalent, under pressure despite the opening and closing of the inlet and exit valves, and at the same time to provide for agitation to prevent the adherence of ice on the walls of the tank, as it is necessary to have the ice remain in crystal form so that it can readily be discharged into the centrifuge with the liquid, from which the ice crystals have been frozen, in order to enable the centrifuge to remove the ice and send the dehydrated liquid on to the next stage of freezing for further extraction of the water by freezing it into ice crystals. It is necessary to keep the centrifuging operation equally under nitrogen pressure to assist in preventing oxidation and also to assist in any further stripping of carbon dioxide gas, the presence of which gases leave an unpleasant taste to the product being dehydrated.

Referring to the drawings:

Figure 1 is a diagrammatic view of a succession of fully enclosed dual valve freezing tanks and associated centrifuge mechanisms, plus means of supplying and evacuating as well as circulating nitrogen or its equivalent gas;

Figure 2 is a section taken vertically through one of the dehydrating units illustrated in Figure 1;

Figure 3 is a diagrammatic view of a typical interconnected dual valve mechanism in order to act as a trap to reduce the escape of nitrogen gas to the minimum.

Figure 4:
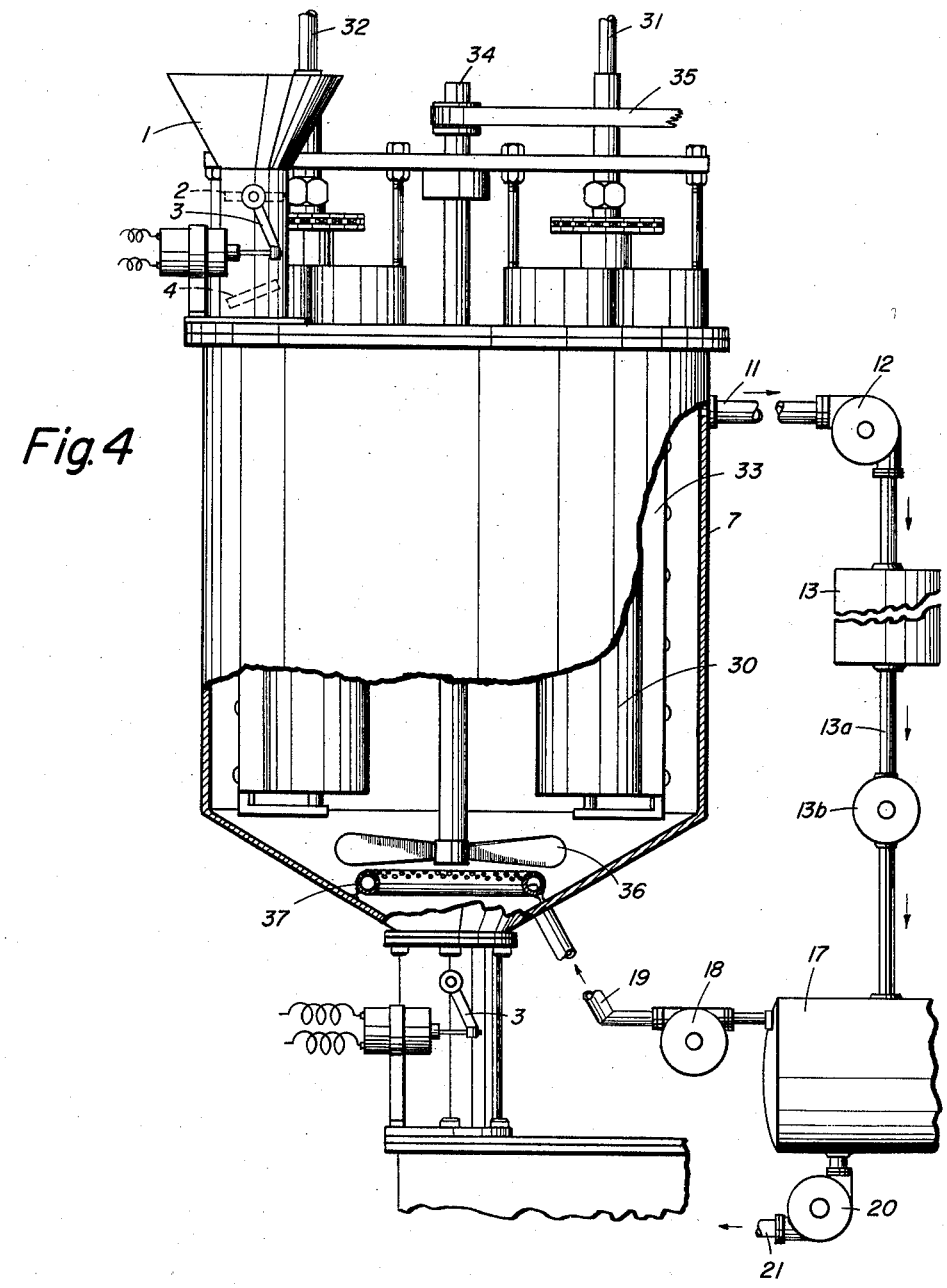
Figure 4 is a section through a modified form in which an agitation mechanism is employed in the tank to prevent ice adherence when that becomes the problem.

Referring to the drawings in more detail, 1 is a hopper inlet, the bottom of which is intermittently closed by the dump valve 2 which is operated either by electric mechanical means or hydro mechanical means. This lever is designated at 3. The companion dump valve 4 is connected by the chain 5 to the valve 2 so that they can be operated together in such a manner that one is always open and one is always closed. These valves are located within the chamber 6. The lower end of chamber 6 communicates with the tank 7 having a cover 8 and an opening 9 communicating with the bottom of the passageway 6.

The tank is refrigerated by any desired means, as shown in Figure 2 or 4, generally designated at 10. The top of this tank is provided with an outlet pipe 11 connected to a suction pump 12 which evacuates nitrogen or its equivalent gas from the upper portion of the tank 7. That gas will be returned for scrubbing through the scrubber 13 to remove the carbon dioxide. The scrubbed gas from the scrubber 13 is delivered through the pipe 13a by the pump 13b to the supply tank 17 so that the gas can be re-used.

The liquid being frozen is placed within the tank, being introduced through the hopper 1 and passageway 6, where the heat sensitive liquid with its solids is subjected to a reduced temperature to cause the liquid to freeze into ice crystals.

The bottom of the tank communicates with a passageway 14 which has a top exit valve 15 and a lower exit valve 16 interconnected by chain 5 so that when the handle 3 operates the valves one is closed and the other is open. Into this chamber 14 is introduced, from the supply tank 17, a supply of nitrogen by the pump 18 through the pipe 19. Nitrogen is also supplied by the pump 20 through the pipe 21 into the centrifuge chamber 23 into which the alternating basket 24 separates the ice from the liquid, which liquid has been delivered into the interior of the basket by the pipe 25.

After centrifuging the concentrated liquid passes through the pipe 26 to the next successive freezing unit, and the ice so extracted passes out through a dual valve in the pipe 27 are disposal. This dual valve is designated at 28 or 29 and has the same construction as that shown in Figure 3.

With reference to Figure 4, tank 7 has depending in it the refrigeration tubes 20 supplied with refrigerant through the pipes 31 and 32. These refrigeration tubes are continuously wiped with the power-driven wipers 33 to prevent the formation of ice. There is also provided in this tank a stirrer consisting of the shaft 34 driven by the belt 35, with a propeller 36 at the bottom of the shaft. When this shaft is driven in one direction the propeller circulates the liquid and ice upwardly, and when it is driven in the other direction it forces the ice downwardly with the liquid to evacuate the tank.

Just below this propeller is a perforated ring 37 which is connected to the pipe 19 so as to provide a means of distributing the nitrogen at the bottom of the tank so that, in cooperation with propeller 36, the nitrogen with the circulating liquid and ice will be carried upwardly to form a nitrogen blanket at the top of the tank. Pipe 11 will remove a portion of this nitrogen and re-circulate it as heretofore described.

The temperatures of the successive tanks may either be progressively lower by approximately 5° to 7° F., or they may be uniform, or the initial tank may be utilized for a sudden drop in temperature to give shock freezing and thereafter the tanks will be at the same temperature; progressively lower or higher according to the type of ice crystal desired to be made and according to the liquid being treated.

In any event the primary object of this invention is to provide the dual effect of stripping the heat sensitive liquid of its carbon dioxide content and of maintaining a blanket of nitrogen or an atmosphere of nitrogen when the liquid is being handled in order to prevent oxidation.

The presence of carbon dioxide leaves a determinable flavor in the concentration of these heat sensitive liquids and their solids which becomes more and more noticeable as the concentration increases. It is an object of this invention to eliminate this objectionable feature.

It will be understood that this invention is susceptible to modification in order to adapt it to different usages, and conditions, and accordingly it is desired to comprehend such modifications within this invention as may fall within the scope of the appended claims.

I claim:

1. In a method of low-temperature dehydration of citrus juices, the steps of subjecting the citrus juice to a temperature lower than the temperature of its freezing point while agitating the juice to remove a portion of the water therefrom in the form of ice crystals, centrifuging the mixture of citrus juice and ice crystals to separate the citrus juice therefrom, passing an inert gas upwardly through the citrus juice while it is being subjected to a freezing temperature and while it is being centrifuged to strip carbon dioxide therefrom and to maintain an anti-oxidation atmosphere, and removing the separated citrus juice to form a citrus juice concentrate.

2. In a method of low-temperature dehydration of citrus juices, the steps of subjecting the citrus juice to a temperature lower than the temperature of its freezing point while agitating the juice to remove a portion of the water therefrom in the form of ice crystals, centrifuging the mixture of citrus juice and ice crystals to separate the citrus juice therefrom, passing an inert gas upwardly through the citrus juice while it is being subjected to a freezing temperature and while it is being centrifuged to strip carbon dioxide therefrom and to maintain an anti-oxidation atmosphere, scrubbing the inert gas which has passed through the citrus juice and subsequently recirculating the scrubbed gas through the citrus juice, and removing the separated citrus juice to form a citrus juice concentrate.

3. In a method of low temperature dehydration of citrus juices, the steps of subjecting the citrus juice to a temperature lower than the temperature of its freezing point while agitating the juice to remove a portion of the water therefrom in the form of ice crystals, centrifuging the mixture of citrus juice and ice crystals to separate the concentrated citrus juice therefrom, passing inert gas countercurrently through the citrus juice while it is being subjected to a freezing temperature and passing inert gas through the mixture of citrus juice and ice crystals being centrifuged to strip carbon dioxide from the juice and to maintain an antioxidation atmosphere, and removing the concentrated citrus juice to form a citrus juice concentrate.

4. A method as set out in claim 3 and wherein the inert gas is nitrogen.

References Cited in the file of this patent

UNITED STATES PATENTS

| | | |
|---|---|---|
| 2,301,901 | McKinnis | Nov. 10, 1942 |
| 2,333,190 | McKinnis | Nov. 2, 1943 |
| 2,552,524 | Cunningham | May 15, 1951 |
| 2,552,525 | Wenzelberger | May 15, 1951 |
| 2,614,048 | Wenzelberger | Oct. 14, 1952 |
| 2,666,707 | Beu | Jan. 19, 1954 |